United States Patent [19]

Penner

[11] 4,046,416
[45] Sept. 6, 1977

[54] TRUCK COVER AND MECHANISM FOR OPERATING SAME

[76] Inventor: Jacob Penner, 335 - 47th Ave., SW., Calgary, Alberta, Canada, T2S 1C1

[21] Appl. No.: 665,923

[22] Filed: Mar. 11, 1976

[30] Foreign Application Priority Data

Apr. 25, 1975 Canada .................................. 225840

[51] Int. Cl.² .............................................. B60J 11/00
[52] U.S. Cl. ...................................... 296/98; 296/100
[58] Field of Search .................................. 296/98, 100

[56] References Cited

U.S. PATENT DOCUMENTS

| 2,230,908 | 2/1941 | Reiman ................................... 296/98 |
| 3,298,734 | 1/1967 | Openshaw ........................... 296/100 |
| 3,310,338 | 3/1967 | Greenberg ........................... 296/100 |
| 3,667,802 | 6/1972 | Love .................................... 296/100 |
| 3,759,568 | 9/1973 | Unruh ................................... 296/100 |

*Primary Examiner*—Robert R. Song

*Attorney, Agent, or Firm*—Stanley G. Ade

[57] ABSTRACT

Many types of loads carried in open trucks require covering either to protect the load from the effects of weather or to prevent part of the load from being blown or spilled from the truck during movement of the truck. A flexible cover is carried on a spring loaded roller at one end of the truck and is connected by the free end thereof to a pair of mounting plates which in turn are supported for endwise rolling movement one upon each outer side wall of the truck body. An endless chain is connected to these mounting plates and is journalled over sprockets at each end of the truck body. A source of power is connected to the sprockets at one end of the truck body and controlled in either direction from the cab of the truck. Micro switches limit the travel of the cover in either direction and the spring loading of the roller maintains the cover taut at all times and permits the cover to be rolled up upon the roller when the cover is retracted.

7 Claims, 9 Drawing Figures

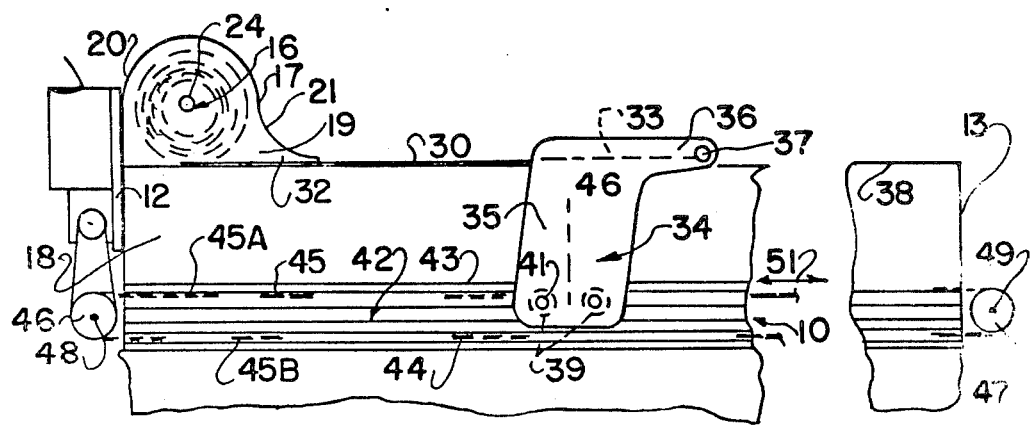
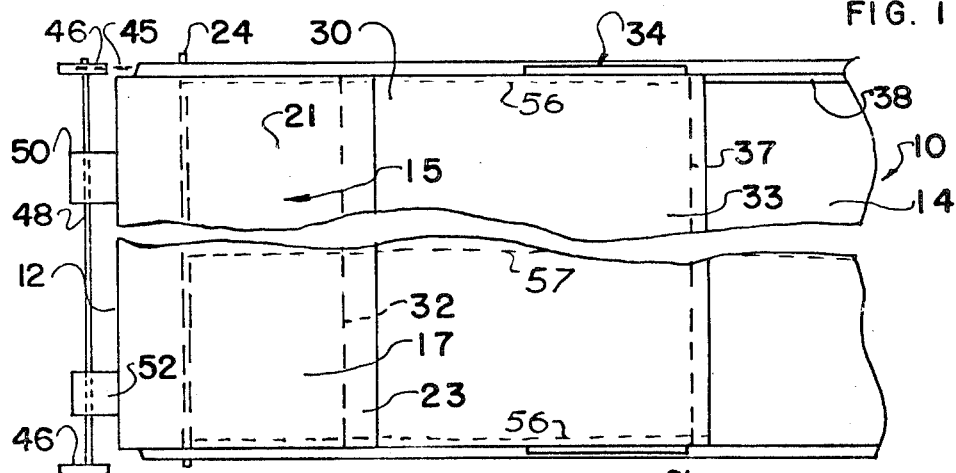
FIG. 1
FIG. 2
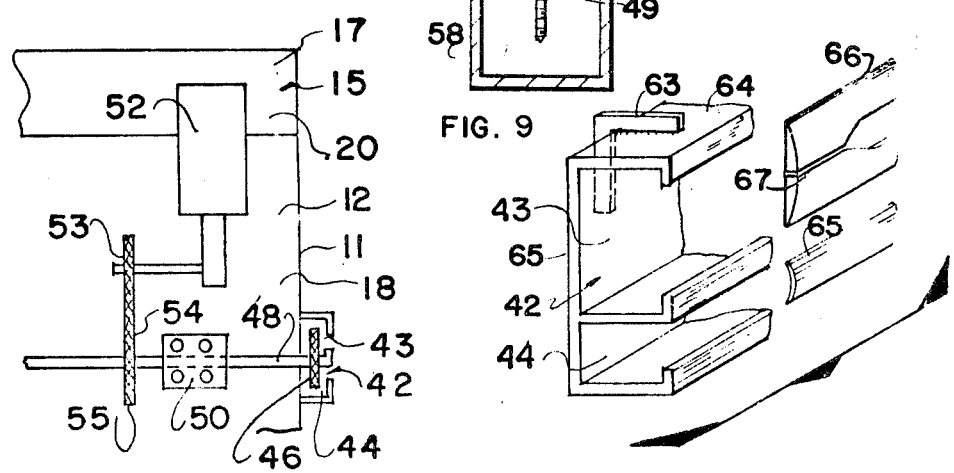
FIG. 3
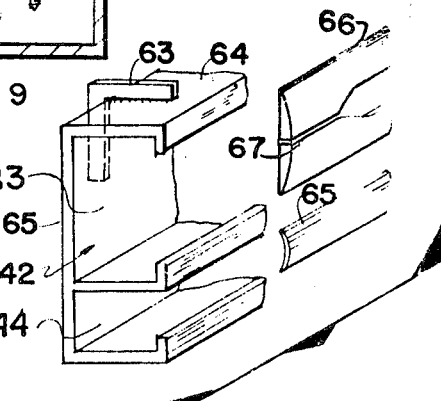
FIG. 4

TRUCK COVER AND MECHANISM FOR OPERATING SAME

BACKGROUND OF THE INVENTION

This invention relates to new and useful improvements in covers or tarpaulins for open truck bodies. Many locations require that certain types of loads be covered when the truck is moving in order to prevent the contents from being blown or spilled upon the highway and many types of loads require the load to be covered in order to protect same from the effects of weather.

Certain mechanically operated covers have been designed to cover and uncover the load, but the majority of these suffer from several disadvantages such as complicated mechanisms and the like and many of these require additional lashing in order to prevent the wind from displacing the cover when extended.

It is quite normal for a tarpaulin or cover to be manually placed upon the open upper side of a truck body which requires some considerable labour and is difficult to handle in windy weather.

SUMMARY OF THE INVENTION

The present invention overcomes these disadvantages by providing a relatively simple mechanism in which a flexible cover or tarpaulin is mounted upon a spring loaded return roller and which can be extended or retracted either fully or partially, from the cab of the truck thus enabling the operator to control the degree of covering remotely.

The principal object and essence of the invention is therefore to provide a device of the character herewithin described which enables a flexible cover or tarpaulin to be extended or retracted over the open top of a truck body from a remote location.

Another object of the invention is to provide a device of the character herewithin described in which the spring loaded roller maintains the cover taut at all times and assists in the rolling of the cover upon the roller during the retraction of the cover.

Still another object of the invention is to provide a device of the character herewithin described which includes novel mounting means upon each side of the truck body attached by an endless chain to a source of power for moving the mounting means along the truck body.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

FIG. 1 is a fragmentary side elevation of part of a truck body with the device mounted thereon.

FIG. 2 is a top plan view of FIG. 1.

FIG. 3 is a partial end view of FIG. 1 taken from the left hand side thereof.

FIG. 4 is a fragmentary isometric view of the mounting rail.

FIG. 9 is an end view of the casing for the sheave with cable adjustors thereon.

In the drawings like characters of reference indicate corresponding parts in the different figures.

DETAILED DESCRIPTION

Figure 5:
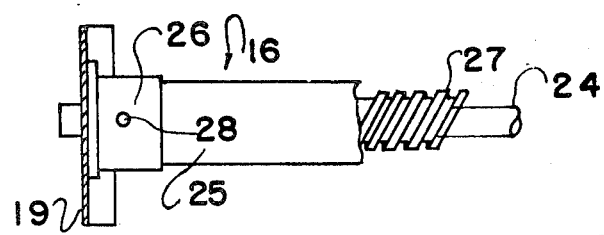
FIG. 5 is a fragmentary partially sectioned view of one end of the roller assembly.

Proceeding therefore to describe the invention in detail, reference character 10 illustrates in general, an open top truck body including a pair of spaced and parallel sides 11, a front end wall 12 and a rear end wall 13 together with the truck body base 14, all of which is conventional.

The invention collectively designated 15 comprises a roller assembly collectively designated 16 housed within an enclosure 17 and mounted across the upper open side of the truck body preferably at the front end 18 thereof.

Figure 6:
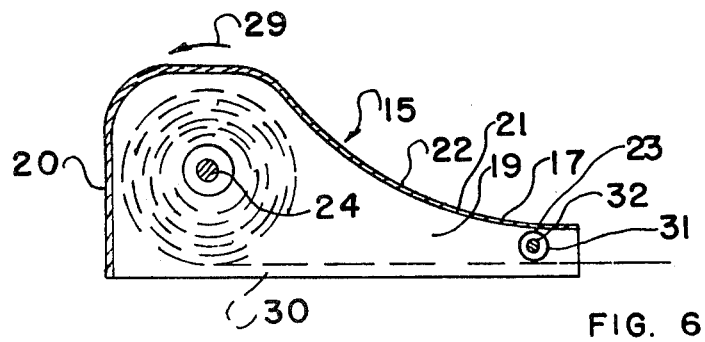
FIG. 6 is a side elevation sectioned in part of the enclosure for the roller assembly.

This enclosure includes a pair of side plates 19, a substantially vertical wall 20 and an upper wall 21 which curves downwardly as at 22 from the upper end of the front wall 20 and then counter curves to the substantially horizontal rear end portion 23 as shown in FIG. 6.

The roller assembly 16 takes the form of a spring loaded return roller similar to a roller blind mechanism. It includes a fixed shaft 24 secured between the side plates 19 of the enclosure, and a roller 25 surrounding the shaft and journalled thereupon by means of the end bearing assemblies 26. A coil tension spring 27 surrounds the shaft 24 and is within the roller 25 and is secured by one end thereof to one end of the roller as indicated by means of bolt 28, and by the other end thereof to the opposite end of shaft 24 (not illustrated). This means that the roller can rotate upon the shaft in the direction of arrow 29 thus tightening the tension spring 27 so that when it is released, the tension spring will rotate the roller in the opposite direction to arrow 29.

A truck cover or tarpaulin 30 is substantially rectangular when viewed in plan and is formed from any flexible material commonly used for covering truck bodies and the like. It is secured by one end thereof to the surface of roller 25 and may be wound thereon as shown in phantom in FIGS. 1 and 6. The cover then extends underneath a roller 31, across the open upper side of the truck body when extended as will hereinafter be described. This roller 31 is mounted upon a shaft 32 extending across the rear ends of the side plates 19 of the enclosure 15.

Means are provided to secure the other end 33 of the cover and to move it across the open upper side of the truck body, taking the form of a pair of mounting plates collectively designated 34.

Each mounting plate includes a substantially rectangular vertically situated portion 35 and an upper rearwardly extendng cover securing portion 36.

A rod or bar 37 extends between the rear ends of the portions 36 and the other end 33 of the cover is secured to this rod or bar which is situated substantially level or just above the upper side edges 38 of the sides 11 of the truck body. By positioning the roller 31 at a similar elevation, the cover is pulled across the open upper side of the truck body and seals same.

Figure 8:
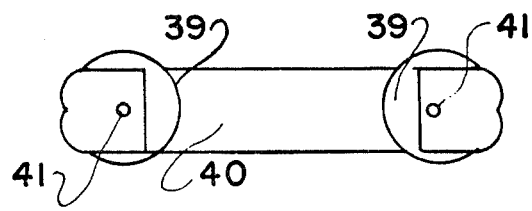
FIG. 8 is an enlarged inside view of the mounting means for the mounting members.

Means are provided to mount the mounting members 35 for movement parallel to the upper edges 38 of the truck sides and take the form of a pair of rollers 39 journalled within a bracket 40 upon pins 41, details of which are shown in FIG. 8. This bracket 40 is secured to adjacent the lower end of the rectangular portions 35 of each of the mounting members 34 and the rollers engage within a track collectively designated 42 secured to each of the side walls 11 of the truck body.

Each track includes an upper channel 43 and a lower channel 44 both channels being horizontal and the pulleys or rollers 39 engage the upper horizontal channel 43.

An endless chain 45 is journalled around front and rear sprockets 46 and 47 secured to cross shafts 48 and 49 respectively and supported upon the front and rear sides of the truck body by means of pillow block bearings 50.

These sprockets are situated adjacent the ends of the channel 42 so that the upper run 45A of the chain runs within the upper horizontal channel 43 and the lower run 45B runs in the lower channel 44.

The channel is secured to the mounting member 34 by means of the bracket 40 so that movement of the chains moves the members 34 in the direction of double-headed arrow 51.

A source of power taking the form of a reversible electric motor 52 is mounted in a convenient location adjacent the upper side of the front 12 of the truck body and a sprocket 53 is driven by this source of power. A chain 54 extends around sprocket 53 and around a further sprocket 55 which is secured to the aforementioned shaft 48 so that the source of power will rotate this shaft 48 in either direction depending upon the electrical connection.

This, of course, moves the chain in either one direction or the other thus moving the mounting members 34 in one direction or the other.

Movement of the upper run 45A of the chain and the mounting members towards the rear of the truck body will extend the cover 30 from the enclosure 15 against pressure of spring 27 so that this spring pressure will maintain the cover taut as it is extended across the top of the truck body.

Movement of the upper run 45A of the chain in the opposite direction will move the mounting members 34 in the opposite direction (e.g. towards the front of the truck body) thus allowing the spring 27 to wind the cover upon the roller 25 once again maintaining it taut as it is being retracted within the enclosure.

Figure 7:
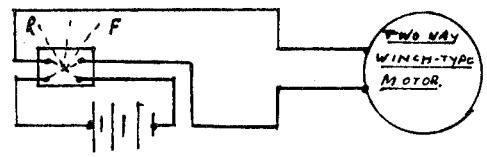
FIG. 7 is a wiring diagram showing the connection between the source of power and the source of electrical energy.

Limit switch means may be provided to cut off the source of power from the electric motor 52 when the cover is fully retracted or fully extended. Alternatively, wiring such as that shown in the wiring diagram of FIG. 7 can be used and is believed to be self-explanatory.

It will therefore be seen that the cover can be extended or retracted either partially or fully, by the operator, with the main control being situated in the cab of the vehicle.

It is desirable that a flexible steel cable 56 is sewn into the tarpaulin cover all around the perimeter and that a central cable 57 is sewn centrally of the cover and bolted and secured by one end thereof to the roller 25. The cables take up the tension and prevent the cover from stretching. This cannot be achieved by rope or fibre reinforcing and as the flexible steel cables have practically no stretch characteristics, the cover can be made as taut as possible without damage occurring to the cover.

Reference to FIGS. 4 and 5 show the preferred embodiment. A small boxing 58 slides into the upper channel 43 and carries the spindle 49 upon which sprocket 47 is journalled for rotation. The endless chain 45 extends around this sprocket.

Means are provided to adjust the tension of this chain by means of the boxing 58 and take the form of an upper bracket 59 welded to the top of the casing and a side bracket 60 welded to one side of the casing. Secure threadable chain adjustors 61 and 62 screw threadably engage within the brackets 59 and 60 respectively with the rear ends (not illustrated) bearing against a member 63 welded to the outside upper surface 64 of channel 43 and to the outside side surface 65 thereof as clearly shown in FIG. 4 thus enabling the boxing 58 to be adjusted relative to the channel 43 thus controlling the tightness of the chain around sprocket 47.

A relatively flexible plastic strip 65 engages within the outer side of channel 44 and seals same from the ingress of dust and the like.

A further flexible plastic member 66 engages the open side of the channel 43 for the same purpose and is provided with a longitudinal slit 67 along the length thereof through which spindles 41 pass with the slit closing up as they proceed through the slit 67.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In a truck which includes a cab, an open top body including a pair of spaced and parallel sides and spaced and parallel rear and front ends, and a source of electrical power in said truck; a truck body cover assembly, said assembly comprising in combination a substantially rectangular flexible cover movable between a fully extended, truck body covering position and a retracted position and any position therebetween, roller means mounted at one end of said truck body adjacent the upper side thereof, said cover being secured by one end thereof to said roller means, and adapted to be rolled upon and dispensed from said roller means, spring return means in said roller means normally urging said roller means to rotate in one direction thereby rolling said cover on said roller means as aforesaid, horizontal rail means on each side of said truck body, mounting means journalled for longitudinal horizontal movement in each of said rail means, means connecting the other end of said cover between said mounting means, means operatively connected to said mounting means whereby said cover is extendible from said roller means against pressure of said spring return means, across the open top of said truck body when said cover is in a truck body covering position and is retracted upon said roller means when in a cover storage position and an endless chain operatively connected between said mounting means upon each side of said truck body and said source of power, each of said chains including an upper run and a lower run, said upper runs being connected to said mounting means, said horizontal rail means including an upper horizontal channel and a lower horizontal channel spaced and parallel to said upper horizontal channel, said upper runs engaging through said upper horizontal channels, and sprockets mounted adjacent each end of said horizontal rail around which said chains extend.

2. The cover assembly according to claim 1 in which each of said mounting means includes a support plate, rollers journalled for rotation adjacent the lower end of said support plate and engaging within said upper horizontal channel for rolling movement therealong, a bar extending between adjacent the upper ends of said support plates, said cover being secured by said other end to said bar.

3. The cover assembly according to claim 1 which includes an enclosure for said roller means, said roller means being journalled for rotation within said enclosure, and a guide roller spanning said enclosure, said cover passing from roller means and underneath said guide roller, said guide roller being situated adjacent the upper side of said truck body.

4. The cover assembly according to claim 2 which includes an enclosure for said roller means, said roller means being journalled for rotation within said enclosure, and a guide roller spanning said enclosure, said cover passing from roller means and underneath said guide roller, said guide roller being situated adjacent the upper side of said truck body.

5. The device according to claim 1 which includes switch means operatively connected between said source of electrical power and said source of power for controlling said source of power, and limit switch means operatively connected between said source of electrical power and said source of power for disconnecting said source of electric power from said source of power when said cover is in the fully retracted and fully extended position.

6. In a truck which includes a cab, an open top body including a pair of spaced and parallel sides and spaced and parallel rear and front ends, and a source of electrical power in said truck; a truck body cover assembly, said assembly comprising in combination a substantially rectangular flexible cover movable between a fully extended, truck body covering position and a retracted position and any position therebetween, roller means mounted at one end of said truck body adjacent the upper side thereof, said cover being secured by one end thereof to said roller means, and adapted to be rolled upon and dispensed from said roller means, spring return means in said roller means normally urging said roller means to rotate in one direction thereby rolling said cover on said roller means as aforesaid, horizontal rail means on each side of said truck body, mounting means journalled for longitudinal horizontal movement in each of said rail means, means connecting the other end of said cover between said mounting means, means operatively connected to said mounting means whereby said cover is extendible from said roller means against pressure of said spring return means, across the open top of said truck body when said cover is in a truck body covering position and is retracted upon said roller means when in a cover storage position and an enclosure for said roller means, said roller means being journalled for rotation within said enclosure, and a guide roller spanning said enclosure, said cover passing from roller means and underneath said guide roller, said guide roller being situated adjacent the upper side of said truck body.

7. The device according to claim 6 which includes switch means operatively connected between said source of electrical power and said source of power for controlling said source of power, and limit switch means operatively connected between said source of electrical power and said source of power for disconnecting said source of electrical power from said source of power when said cover is in the fully retracted and fully extended position.

* * * * *